Feb. 13, 1968  A. NAKANO  3,368,598
NUT-HUSKING APPARATUS
Filed Nov. 8, 1965
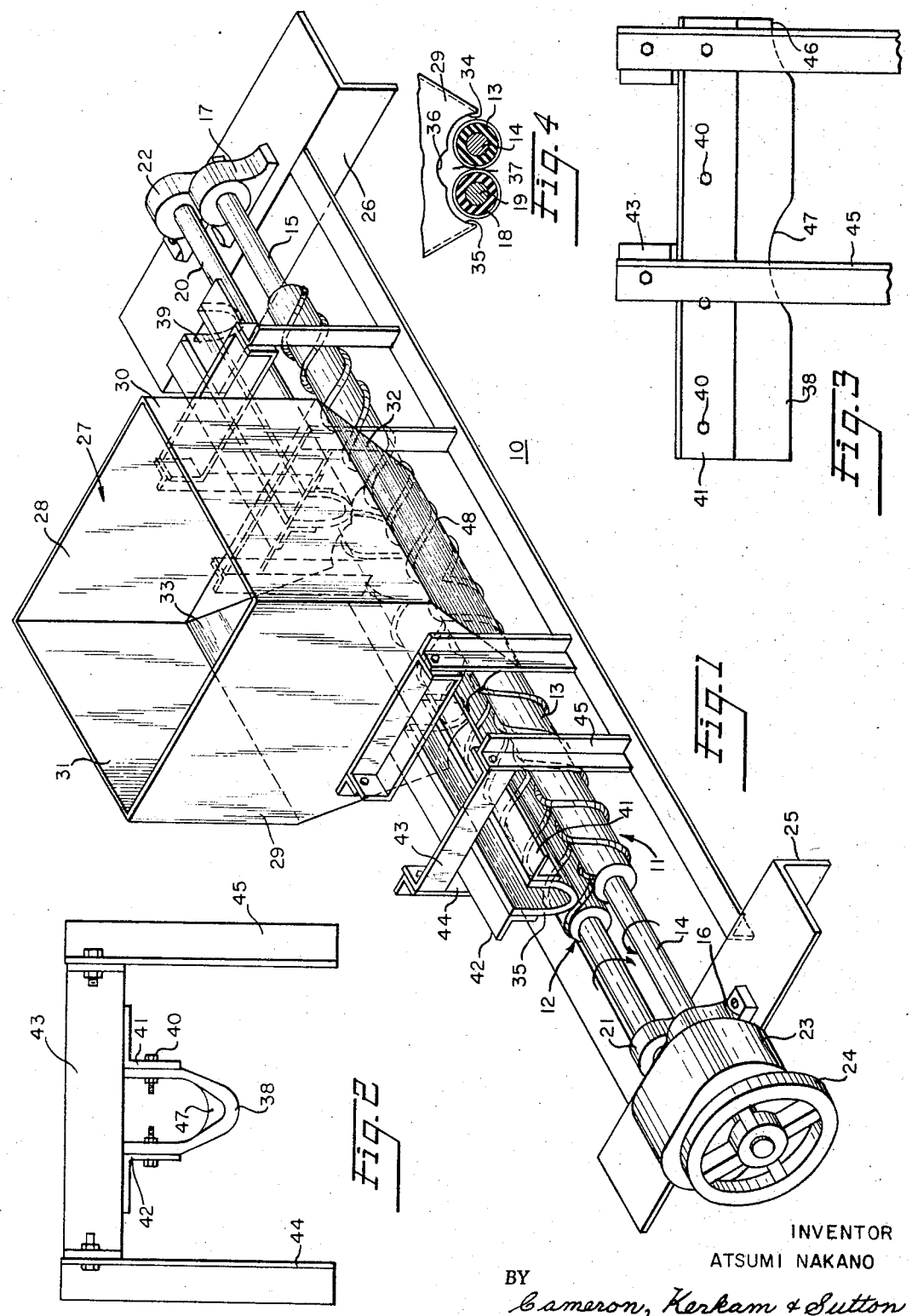
INVENTOR
ATSUMI NAKANO
BY
Cameron, Kerkam & Sutton
ATTORNEYS United States Patent Office 3,368,598
Patented Feb. 13, 1968

3,368,598
NUT-HUSKING APPARATUS
Atsumi Nakano, 349B Kukuau St.,
Hilo, Hawaii 96720
Filed Nov. 8, 1965, Ser. No. 506,674
9 Claims. (Cl. 146—8)

ABSTRACT OF THE DISCLOSURE

Macadamia nuts are husked by delivery to a pair of parallel counter-rotating scrolls. A pressure bar above the scrolls presses the nuts onto the scrolls to break and strip the husks from the nuts.

---

The present invention relates generally to husking apparatus and, more particularly, to nut-husking apparatus for separating husk pieces and in-shell nuts.

Inasmuch as the invention is especially well adapted for husking of Macadamia or Queensland nuts, the following description will be directed to this specific application of the inventive concept. By so doing, however, it is not intended to limit the scope of the invention or its application, particularly since a Macadamia nut, although technically classified in a botanical sense as a follicle, is popularly referred to as nut. Accordingly, when reference is hereinafter made to nuts, it is meant that specie of fruit having a kernel of meat in a shell enclosed by a hard husk.

A primary object of the present invention is to provide an improved nut-husking apparatus which is extremely efficient in operation.

Another object of the present invention is to provide an improved scroll-type husking apparatus which has the advantage of being its own husk piece separation machine.

A further object of the present invention is to provide an improved nut-husking machine which provides an in-shell per hour production greater than heretofore possible with conventional nut huskers.

To this end, the nut-husking apparatus of the present invention comprises a feed hopper adapted to deliver nuts which are to be husked to a pair of parallel, counter-rotating scrolls which convey the in-husk nuts in opposite directions. The in-husk nuts are fed individually under a pressure bar which cooperates with the counter-rotating scrolls and causes a husk to be chipped or broken, after which the remaining husk is stripped from its in-shell nut upon continued counter-rotation of the scrolls. The husk pieces are pulled down between the scrolls, while the separated in-shell nuts are conveyed to a delivery or collection area at the end of the scrolls.

In accordance with one feature of the present invention, the clearance maintained along the greater portion of the length of the scrolls is such as to make it difficult for in-husk nuts to move along the scrolls until such time as the husk is removed. To this end, the pressure bar is provided with a raised or relief portion adjacent the exit point for the in-husk nuts from the feed hopper so as to facilitate gripping of the husks by the scroll. The raised portion permits a limited amount of unobstructed travel of in-husk nuts under the pressure bar where the husk is first fractured or broken and then separated from the in-shell nuts. The pressure bar may be provided with a second raised portion spaced from the first raised portion in the direction of travel of the nuts in the event that a nut is carried under the pressure bar beyond the first raised portion without being husked, the second raised portion allows the nut to turn and reposition itself.

In accordance with another feature of the present invention, the scrolls are formed from rolls having rods spiraled along each roll with opposite pitch from the middle of the roll outward so as to cause the in-husk nuts to move along the rolls outwardly in opposite directions from the feed hopper. The diameter of the rods spiraled about the rollers beneath the feed hopper is maintained larger than the diameter of the rods spiraled about the rollers beneath the pressure bars. This insures that the portion of the scrolls beneath the feed hopper serves to convey the nuts, while the portion of the scrolls disposed on opposite sides of the feed hopper operate in combination with the pressure bar to break and separate the husks.

Other features and advantages of the present invention will be readily apparent from the following description. While the specification concludes with claims particularly pointing out and distinctly claiming the subject matter of the present invention, the invention will be more clearly understood from the following detailed description taken in connection with the accompanying drawings; however, it is to be expressly understood that the drawings are for the purpose of illustration only and are not intended to represent the full scope of the invention which is defined by the appended claims.

In the drawings, wherein like characters refer to like parts throughout the several views:

FIG. 1 is an isometric view of the husking apparatus of the present invention;

FIG. 2 is a front-elevational view of the pressure bar and supports therefor shown in FIG. 1;

FIG. 3 is a side-elevational view of the pressure bar illustrated in FIG. 2, and FIG. 4 illustrates in vertical section the relationship between the discharge portion of the feed hopper and the husking scrolls.

Referring to FIG. 1, reference numeral 10 designates generally the nut-husking apparatus of the present invention comprising a pair of scrolls 11 and 12 adapted to be driven in counter-rotation as indicated by the arrows. Scroll 11 is formed from a hardened steel roller 13 and includes reduced shaft portions 14 and 15 at opposite ends thereof which are conveniently supported in pillow blocks 16 and 17, respectively. Scroll 12 is similarly constructed and includes roller 18 and reduced shaft portions 19 and 20 supported in pillow blocks 21 and 22, respectively.

The ends of shafts 14 and 19 are driven through a gear mechanism (not shown) housed in gear box 23 which is in turn operatively connected to a suitable power source in a conventional manner such as, for example, by pulley 24. Pillow blocks 16, 17 and 21–22 are secured to angle supports 25 and 26 so that scrolls 11 and 12 are disposed in spaced parallel relationship, the distance between the scrolls being such as to prevent nuts from dropping between the scrolls. Angle supports 25 and 26 may be supported above the ground by upright members (not shown) to enable placement of suitable collecting means beneath the scrolls to collect the stripped husks and in-shell nuts.

Centrally of scrolls 11 and 12 is disposed a feed hopper 27 adapted to feed the nuts to be husked by gravity to the intermediate portions of scrolls 11 and 12. In the form illustrated, feed hopper 27 comprises side walls 28, 29, 30 and 31 and inclined lower walls 32 and 33 which terminate adjacent the outward sides of scrolls 11 and 12. Side walls 28 and 29 are gradually reduced in length towards the lower ends thereof, as shown, and the lowermost edges are advantageously curved to follow the contour of the rollers. Each lowermost edge of side walls 28 and 29 is cut in the form of segmented arcs 34, 35 and 36 each having an arc greater than 90°. The outer arcs 34 and 35 are joined at their innermost ends by central arc segment 36 having a radius less than that of the outer arc segments. In this manner, the central arc segment forms an opening or passage 37 through which the in-husk nuts from the feed hopper exit.

It should be apparent that, although scrolls 11 and 12 are spaced from each other, the spacing therebetween is small enough to prevent in-husk and in-shell nuts from passing therebetween. Thus, the feed hopper is closed at the bottom to the nuts and there is in effect provided a movable base which, when the scrolls are driven, conveys the nuts in opposite directions through openings 37. Openings 37 are small enough to prevent more than one nut at a time from exiting from each side of the feed hopper and the in-shell nuts are carried to the extremities of the scrolls where they fall between the reduced shaft portions into a suitable container (not shown).

Supported adjacent each exit opening 37 on opposite sides of the feed hopper is an elongated pressure bar 38 and 39. Each pressure bar is formed from a relatively stiff, but yieldable material such as, for example, molded rubber reinforced with nylon cord. The pressure bars are generally U-shaped in cross-section having opposite legs of the U attached in conventional manner such as, for example by bolts 40 to spaced supports 41 and 42 so that the bight of the U is disposed parallel to the axes of the scrolls. Supports 41 and 42 are in turn secured to a pair of bar frames, each of which comprise a cross-piece 43 and a pair of vertical supports 44 and 45. In this manner, each pressure bar is supported above and parallel to the axes of the scrolls 11 and 12, the clearance between the pressure bars and the scrolls being such that it is difficult for in-husk nuts to move along the scrolls.

Referring to FIGS. 2 and 3, each pressure bar is provided at one end with a raised or relief portion 46 disposed adjacent the outlet of the feed hopper 27 which permits a limited amount of unobstructed free movement of in-husk nuts beyond the feed hopper under the pressure bar. A second raised portion 47 is provided on each pressure bar intermediate its ends. Advantageously, the second raised portion 47 is disposed centrally of the pressure bar.

The majority of the husking is accomplished under the sections of the pressure bars between the first and second raised portions; however, if an in-husk nut rides under the first section without being husked, the second raised portion allows the in-husk nut to turn and reposition itself, after which is passes to the second section to provide a second opportunity for the nut to be husked.

In operation, the in-husk nuts are first dropped into the feed hopper and delivered by gravity feed to the scrolls 11 and 12 which are driven in counter-rotation by power applied to the pulley 24. As the scrolls are rotatably driven in opposite directions, the nuts are conveyed in opposite directions to the opposite exit openings 37 of the feed hopper and enter under the raised portions of the pressure bars.

It should be apparent that, at this point, the in-husk nuts are turning and will continue to turn until a husk is firmly engaged between a pressure bar and a pair of scrolls. Advantageously, each scroll may include a helical wire rod wrap 48 having a greater diameter between the exit openings 37 of the feed hopper to facilitate the feeding of the nuts. The reduced diameter portion of the rod 48 outside the exit openings first fractures and breaks the husk and then upon continued rotation of the scrolls, strips the husks from the nut by pulling it down between the rollers. As hereinbefore described, the majority of the husking is accomplished between the two raised sections 46 and 47 of a pressure bar; however, if an in-husk nut reaches the second raised section 47, the increased clearance allows the nut to turn and reposition itself, affording a second opportunity for the husk to be chipped and stripped. Continued rotation of the scrolls causes the in-shell nuts to be conveyed to the end of the scrolls where they are dropped off between the shafts.

As hereinbefore described, the clearance between the pressure bars and the scrolls is such that it is difficult for in-husk nuts to move forward along the scrolls until the husk has been removed. Advantageously, the two scrolls are maintained with a spacing of approximately ½ inch and rod 48 is constructed with a ¼ inch diameter outside the feed hopper, while the rod in the feeding section of the hopper is provided with a ⅜ inch diameter. These dimensions have been found to be particularly advantageous for husking Macadamia nuts, and with scrolls driven at 750 r.p.m., a production of 3,200 pounds of in-shell nuts per hour can be realized.

There is thus provided by the present invention apparatus for husking hard-shell nuts which is extremely simple, yet highly efficient in operation. Although the operation has been described with reference to only one embodiment thereof, it will be readily apparent to those skilled in the art that various modifications may be made without departing from the inventive concept. It is therefore intended by the appended claims to cover all such modifications which fall within the true spirit and scope of the invention.

What is claimed is:

1. A nut-husking machine comprising a feed hopper, a plurality of rotatable, parallel rolls disposed to receive in-husk nuts from said feed hopper, means for driving said rolls in opposite directions, each of said rolls including a scroll extending therealong in cooperative relationship for conveying in-husk nuts away from said feed hopper and means disposed in the path of travel of the nuts for breaking the husks of the nuts and separating the in-shell nuts from their husks, said means disposed in the path of travel of the nuts including a pressure bar mounted above said rolls and spaced therefrom a distance sufficient to impede the flow of in-husk nuts along said rolls while allowing an unobstructed flow of in-shell nuts.

2. A nut-husking machine as set forth in claim 1 wherein each of said scrolls have an opposite pitch extending from an intermediate point on a corresponding roll for conveying in-husk nuts away from said feed hopper in opposite directions.

3. A nut-husking machine as set forth in claim 1 wherein said pressure bar is formed from a relatively stiff, yieldable material having a relief portion at one end to permit a limited amount of unobstructed travel of said in-husk nuts beneath said pressure bar.

4. A nut-husking machine as set forth in claim 3 wherein said pressure bar further includes a second relief portion spaced from said relief portion at one end in the direction of the travel of the nuts to allow in-husk nuts travelling beyond said first relief portion to turn and reposition themselves.

5. A nut-husking machine as set forth in claim 3 wherein said material is molded rubber.

6. A nut-husking machine as set forth in claim 1 wherein said plurality of rolls form a base for said feed hopper and further including an exit opening on opposite sides of said feed hopper to permit discharge of said nuts from said feed hopper simultaneously in opposite directions, each of said scrolls having an opposite pitch extending from an intermediate point on a corresponding roll to effect said discharge, and said means disposed in the path of travel of the nuts includes a pressure bar adjacent each exit opening, each of said pressure bars being spaced above said rolls so as to impede the flow of in-husk nuts along said rolls while allowing an unobstructed flow of in-shell nuts.

7. A nut-husking machine as set forth in claim 6 wherein each of said pressure bars is a relatively stiff, yieldable material having a relief portion at one end to permit a limited amount of unobstructed travel of said in-husk nuts beneath said pressure bar.

8. A nut-husking machine as set forth in claim 7 wherein each of said pressure bars has a second relief portion spaced from said relief portion at one end in the direction of travel of the nuts to allow in-husk nuts travelling beyond said first relief portion to turn and reposition themselves.

9. A nut-husking machine as set forth in claim 6 wherein each of said pressure bars is a relatively stiff, yieldable, molded rubber elongated member, U-shape in cross section, the bight of said U-shape elongated member extending parallel to the axis of said rolls.

References Cited

UNITED STATES PATENTS

| | | | |
|---|---|---|---|
| 1,190,554 | 7/1916 | Kelly | 146—32 |
| 2,065,093 | 12/1936 | Rebechini | 146—32 |
| 2,529,620 | 11/1950 | Marnach | 146—8 X |

JAMES M. MEISTER, *Primary Examiner.*